United States Patent Office 2,744,938
Patented May 8, 1956

2,744,938

REMOVAL OF COLOR IMPURITIES FROM ORGANIC COMPOUNDS

Peter Urban, Jr., Chicago, Ill., assignor to Universal Oil Products Company, Chicago, Ill., a corporation of Delaware No Drawing. Application July 24, 1952,
Serial No. 300,761

12 Claims. (Cl. 260—613)

This invention relates to the treatment of color-sensitive organic compounds which have become discolored through oxidation or upon aging of the compound whereby the colored impurities are removed and a product free from discolored contaminants and having only its own natural color is produced. More specifically, the invention concerns the decolorization of a discolored organic compound dissolved in a solvent therefor, utilizing a solid adsorbent in the presence of hydrogen maintained at a superatmospheric pressure.

Many types of organic compounds, particularly compounds containing one or more hydroxyl, aldo, keto, or amino groups per molecule undergo discoloration when exposed to atmospheric oxygen or when aged for relatively long periods of time under conditions which induce self-deterioration. The discoloration is believed to be caused by the presence of oxidized derivatives in the body of the compound and in many cases is accompanied by a rancid or unsavory odor caused by the presence of a definite and distinct impurity in the product. Aside from the undesirability of contamination of the product with the impurity which does not possess the properties of the original compound intended, the unnatural color and unsavory odor in many instances make the product unsalable to the consuming public, particularly when the compound is utilized in a food preparation or for other uses in which the color and odor suggests an undesirable contamination of the material with which it is associated. In some instances, the color contamination occurs as a result of heating the organic compound to a temperature above its color stability point, resulting in the appearance of tan, brown or even darker color variation from the natural color of the product. As indicated previously, the discoloration may occur upon mere contact of the compound with atmospheric oxygen or upon storage of the product in contact with air or even in closed containers out of contact with external sources of oxygen. The development of tan and brown discoloration occurs frequently in the storage of phenolic materials, that is, aromatic compounds containing an hydroxyl group as a nuclear substituent, such as the cresols, the alkylalkoxyphenols and particularly alkylalkoxyphenols in which the alkyl group is a tertiary alkyl substituent, as in the case of tertbutylhydroxy anisole and in compounds containing a carbonyl aldehyde or keto group, represented by such compounds as vanillin and its alkoxy and acyloxy derivatives. The problem of discoloration is also apparent in compounds containing one or more amino groups, particularly when hydroxyl or formyl substituents occur in the same molecule, as for example, in the case of the aminophenols. The presence of the above-indicated color-labile groups in the molecular structure of such organic compounds is believed to be due to the formation of groups in the structure of the molecule and conjugation of unsaturated linkages, which in the case of the aromatic derivatives is believed to take the form of conjugated quionoid linkages.

In one of its embodiments, the present invention relates to an improvement in the method of decolorizing an organic compound subject to color deterioration whereby a solution of said compound in a solvent therefor is contacted with a solid, activated adsorbent at decolorizing conditions, said improvement comprising contacting said solution of organic compound with solid adsorbent in the presence of hydrogen maintained at a superatmospheric pressure.

A more specific embodiment of the invention concerns a method of decolorizing an alkylphenol subject to color deterioration which comprises contacting an alcohol solution of said alkylphenol with from about 1 to about 20 parts by weight of activated carbon per part by weight of alkylphenol in said solution at a temperature of from about 40° to about 150° C. in the presence of hydrogen maintained in the contacting zone at a superatmospheric pressure sufficient to maintain said alcohol substantially in liquid phase.

The method of treating organic compounds containing various discoloring impurities with activated adsorbents, such as an activated charcoal, while the organic compound is dissolved in a suitable solvent and thereafter filtering the spent adsorbent containing the discoloring impurity from a substantially decolorized solution of the desired compound has been utilized to produce a product of more pleasing qualities having greater consumer appeal. The method, however, has not been completely successful with certain types of compounds, particularly the alkyl and alkylalkoxyphenols, the method generally resulting in incomplete decolorization of the product. It has now been found that by conducting the decolorizing treatment in the presence of an atmosphere of hydrogen under pressure, the decolorized product recovered from the solvent contains much less residual discoloration and the resulting product does not tend to undergo further discoloration under prolonged storage. The method thus represents a substantial improvement over the method of decolorization effected by simply contacting the discolored organic compound with the activated adsorbent in the absence of hydrogen and thus represents a decided improvement over the art as heretofore practiced.

In accordance with the present method of treating organic compounds containing discoloring contaminants and compounds subject to color deterioration, the compound is dissolved in a suitable solvent therefor, usually a hydrocarbon solvent such as a liquid paraffin, including n-pentane, n-hexane, cyclohexane, isopentane, 2,3-dimethylbutane; aromatic hydrocarbon solvents, such as benzene, toluene, xylene, etc.; an alcohol, such as methanol, ethanol, n-propanol, iso-propanol, n-butanol, iso-butanol, tert-butyl alcohol, etc.; an ether such as methylethyl ether, diethyl ether, di-isopropyl ether, ethylpropyl ether, etc.; an ester such as methyl acetate, ethyl acetate, ethyl formate, etc.; a glycol, such as ethylene glycol, propylene glycol, etc., or any of the many other classes of solvents is mixed with in activated adsorbent in the presence of an atmosphere of hydrogen maintained under superatmospheric presure. Suitable activated adsorbents for this purpose include silica gel particles which are activated or rendered more adsorptive by heating to a temperature of from about 150° to about 350° C. for a period of time of from about ½ to about 6 hours or longer, activated alumina which when heated to a temperature of from about 200° to about 500° C. is made more adsorptively active than the unheated alumina such as natural bauxite, activated charcoal or other forms of carbon activated by heating to temperatures above about 150° C., and particularly certain sources of charcoal prepared, for example, from special cellulose stocks, such as charcoal formed by heating peach pits, nut hulls such as pecan and walnut hulls and from other sources including wood fibers or wood particles generally. Another type of activated adsorbent suitable for use in the present process includes certain clays which may be activated by acid treatment, preferably a volatile acid such as hydrochloric acid or by thermal activation, effected by heating to temperatures of from about 150° to about 500° C. Adsorbent clays of this type include fuller's earth, kieselguhr, fluoridin, montmorillonite and others of a siliceous, aluminiferous or aluminasilica composition. A siliceous type of adsorbent particularly useful in the present process is an activated synthetic silica precipitated as hydrous silicic acid from a suitable alkali metal silicate or alcohol ester of silicic acid. The activated silica type of adsorbent may be prepared, for example, by precipitation of hydrous silicic acid from water glass (an aqueous sodium silicate sol) by the addition thereto of a mineral acid, such as sulfuric or hydrochloric acid until the silicate has been substantially completely converted to the hydrous metal oxide. The filtered oxide gel which may be repeatedly washed to remove other inorganic alkali metal ions is thereafter dried, heated to a temperature of from about 150° to about 600° C. and broken up into finely divided particles for use in the present decolorizing treatment. The method of preparing solid adsorbents, their composition and the process suitable for their activation are generally well known in the art and such methods are in general utilizable for preparation of the activated adsorbents herein. By the term "activated adsorbents" as specified herein is meant certain solid compounds having adsorbent properties whose activity with respect to adsorbing and retaining the undesirable discoloring impurities in normally water-white or clear-colored organic compounds is enhanced by physical or chemical treatment.

The present decolorizing treatment is effected by contacting a solution of the product to be decolorized in a suitable solvent with the solid adsorbent and in the presence of a superatmospheric pressure of hydrogen and thereafter separating the adsorbent from the decolorized solution. The solution of the compound to be decolorized may be of any concentration, up to complete saturation of the solvent, but preferably a relatively dilute solution of the organic compound to be decolorized is utilized, such as a solvent containing from about 0.1 to about 2 molar concentration of the discolored organic compound, depending upon the molecular weight of the compound to be decolorized. The quantity of solid adsorbent required to effect the decolorization treatment varies with the quantity of discoloring contaminant in the compound or product subjected to decolorization, as well as the type of adsorbent charged to the process. In general, however, the quantity of adsorbent required is from about 0.001 to about 2.0 parts by weight of activated adsorbent per part by weight of compound subjected to the present decolorizing treatment, the quantity of adsorbent being dependent upon the concentration of compound within the solvent, the temperature, the type of impurity to be removed from the organic compound and other mutually operative factors. One of the preferred methods of treating the discolored compound, particularly highly discolored products, comprises decolorizing the charge in several successive treatments with small quantities of adsorbent, removing the aliquot "spent" adsorbent. It is also generally characteristic of the present decolorization treatment that yellow and brown colored contaminants are removed from organic compounds with relatively greater ease than red and blue colored contaminants, such that smaller proportions of activated adsorbent are required for the removal of yellow and brown colored impurities than other contaminants.

The present decolorization treatment is effected at temperatures generally above about 40° C. and below the boiling point of the solvent utilized in the process at the particular pressure of the hydrogen atmosphere, generally at temperatures below about 150° C. In many instances, it is preferred to reflux the solvent from the mixture of solid adsorbent and solution of the organic compound undergoing decolorization as the solvent is distilled from the treating vessel into the reflux condenser. The hydrogen is maintained in the treating zone at a superatmospheric pressure, preferably from about 5 pounds per square inch to about 300 pounds per square inch, or higher, if desired. One of the preferred methods of supplying the hydrogen to the treating vessel comprises bubbling a continuous stream of the hydrogen through the solution of the compound undergoing decolorization, suitably in the form of finely divided bubbles to effect maximum contact of the hydrogen with the adsorbent held in suspension in the solution and the dissolved compound undergoing decolorization. It is found that by bubbling the hydrogen into the bottom of the treating vessel, the solid adsorbent which normally tends to settle from the mixture is maintained in a state of suspension within the solution and maximum contact between the adsorbent and hydrogen is thus obtained. The hydrogen for this purpose may be continuously recycled in the system.

The decolorization treatment of the present process may be accomplished by either batch or continuous methods, batch methods being generally preferred because of the greater feasibility of separating the products from the reaction mixture and effecting a complete change of adsorbent in each treating stage of the process. As indicated previously, one means of effecting the present treatment comprises bubbling the hydrogen reactant into the lower portion of a vertical, elongated treating zone which may comprise a distilling flask having attached thereto a reflux condenser, the hydrogen being admitted at a superatmospheric pressure into the lower portion of the vessel, thereby maintaining the solid adsorbent in a state of suspension within the solution of organic compound being decolorized. Various means of stirring the reaction mixture and maintaining the solid adsorbent in suspension within the solution are also desirably provided in the equipment and for this purpose, motor driven stirring paddles may be incorporated into the reaction vessel. Although batch-type operations are generally preferred, continuous methods of operation are nevertheless feasible and may in some instances be more suitable than batch processing. Thus, a continuous stream of a solution of the organic compound dissolved in the solvent and containing in suspension the solid adsorbent may be allowed to flow over a vertical or inclined surface as a thin film, an atmosphere of hydrogen being provided in the apparatus in contact with the thin film. The method is particularly adapted for the use of relatively low density adsorbents, such as activated charcoal, although other types of adsorbent may be utilized when special methods of maintaining the adsorbent in suspension within the solution are provided, as for example, by a series of stirring devices along the line of flow.

The present invention is further illustrated with respect to certain of its specific embodiments in the following examples, which, however, are not intended to unduly limit the scope of the invention in strict accordance therewith.

*Example I*

A sample of 2-tert-butyl-4-methoxyphenol, prepared by condensing tert-butyl alcohol with the mono-methyl ether of hydroquinone in the presence of 85% phosphoric acid, contains a dark-colored impurity when initially prepared by separation from its reaction mixture and tends to undergo further discoloration when stored or otherwise subjected to aging. Decolorization of the above phenolic compound is obtained by refluxing a 95% ethanol solution of the crude phenolic mixture containing 12% by weight of the impure phenol in the presence of an activated carbon and hydrogen at a superatmospheric pressure. The activated carbon is a sample prepared by carbonization of birch wood which is activated by passing hydrogen through a column of the carbon particles heated to a temperature of about 400° C. A hydrogen atmosphere is maintained in the treating flask at a pressure of 40 lbs./in.² during the reflux operation. Approximately 10 grams of activated carbon are present in the alcohol solution per 100 grams of 2-tert-butyl-4-methoxyphenol. The mixture is stirred as the ethanol solution is refluxed for a period of 30 minutes, and thereafter filtered to remove the "spent" carbon from the solution. The recovered alcoholic solution of 2-tert-butyl-4-methoxyphenol is water-white and when evaporated to dryness over a steam bath, the decolorized product is also water-white. After aging in a closed container for 12 months, the product decolorized by means of this procedure remains colorless.

A similar sample of 2-tert-butyl-4-methoxyphenol treated in the same manner as indicated above, except that the treatment is effected in the absence of an atmosphere of hydrogen produces a filtered alcoholic solution having a yellow-tan cast, and repeated treatment with an equal portion of activated carbon is essential to reduce the color further, although, even after three additional treatments, the product in large masses possesses a slight tan discoloration.

Example II

A sample of vanillic acid prepared by the oxidation of vanillin (4-hydroxy-3-methoxybenzaldehyde) in an aqueous solution of potassium permanganate possesses a tan discoloration when recrystallized from an aqueous ethanol solution. When the solution (containing 18 parts by weight of vanillic acid per 100 parts by weight of solution) is refluxed in the presence of 5 parts by volume of activated charcoal per 100 parts by volume of solution, the charcoal being kept in suspension in the solution by the ebullition of the boiling alcohol, two treatments are required to produce a colorles crystalline compound. When a similar decolorization treatment using the same quantity of activated charcoal per unit weight of vanillic acid is effected in the presence of hydrogen at a pressure of 10 lbs./in.², colorless crystals of the desired compound are obtained in the first treatment; the vanillic acid product melts over a narrower melting point range in the case of the product decolored in the presence of hydrogen.

I claim as my invention:

1. A process for decolorizing an alkyl phenol which has become discolored through oxidation, which comprises contacting a solution of the alkyl phenol in a solvent therefor with a catalyst-free solid adsorbent selected from the group consisting of activated carbon, alumina, clays and silica gel at a temperature of from about 40° to about 150° C. and in the presence of hydrogen maintained at a superatmospheric pressure to absorb the discoloring impurity in the solid material, and separating the thus treated alkyl phenol solution from the solid material.

2. The process of claim 1 further characterized in that said solvent is an organic compound which is liquid at the temperature and pressure of contacting the solution with the adsorbent.

3. The process of claim 2 further characterized in that said organic solvent is an alcohol.

4. The process of claim 1 further characterized in that said solid adsorbent is maintained in a state of suspension within the solution of alkyl phenol during the contacting step.

5. The process of claim 1 further characterized in that said hydrogen is introduced as a continuous stream and at a superatmospheric pressure into the solution of alkyl phenol as the solid absorbent is maintained is suspension within said solution.

6. The process of claim 1 further characterized in that said solid adsorbent is activated carbon.

7. The process of claim 1 further characterized in that said solid adsorbent is fuller's earth.

8. The process of claim 1 further characterized in that said alkyl phenyl is an alkylalkoxyphenol.

9. The process of claim 8 further characterized in that said alkylalkoxyphenol is 2-tertiary butyl - 4 - methoxyphenol.

10. A process for decolorizing 2-tertiary butyl-4-methoxyphenol contaminated with a discoloring impurity which comprises dissolving said phenol in a solvent consisting essentially of ethyl alcohol, mixing the resulting solution with a catalyst-free activated vegetable charcoal at a temperature corresponding to the boiling point of the alcohol and in the presence of hydrogen maintained at a superatmospheric pressure of from about 5 to about 300 pounds per square inch to absorb the discoloring impurity in said charcoal, and separating the thus treated solution from the charcoal.

11. A process for decolorizing 2-tertiary butyl-4-methoxyphenol contaminated with a discoloring impurity which comprises dissolving said phenol in an alcohol solvent, mixing the resulting solution with a catalyst-free activated vegetable charcoal at a temperature corresponding to the boiling point of the alcohol and in the presence of hydrogen maintained at a superatmospheric pressure of from about 5 to about 300 pounds per square inch to absorb the discoloring impurity in said charcoal, and separating the thus treated solution from the charcoal.

12. A process for decolorizing 2-tertiary butyl-4-methoxyphenol contaminated with a discoloring impurity which comprises dissolving said phenol in an alcohol solvent, mixing the resulting solution with a catalyst-free activated vegetable charcoal at a temperature of from about 40° to about 150° C. and in the presence of hydrogen maintained at a superatmospheric pressure of from about 5 to about 300 pounds per square inch to absorb the discoloring impurity in said charcoal, and separating the thus treated solution from the charcoal.

References Cited in the file of this patent

UNITED STATES PATENTS

| | | |
|---|---|---|
| 1,971,930 | Christiansen | Aug. 28, 1934 |
| 1,973,833 | Wietzel et al. | Sept. 18, 1934 |
| 2,444,589 | Blann | July 6, 1948 |
| 2,488,479 | Schindler | Nov. 15, 1949 |
| 2,574,331 | Knox | Nov. 6, 1951 |
| 2,616,830 | Pratt | Nov. 4, 1952 |